Oct. 22, 1940.　　　C. C. STREET　　　2,219,037
COMPARISON MECHANISM
Filed Dec. 11, 1939
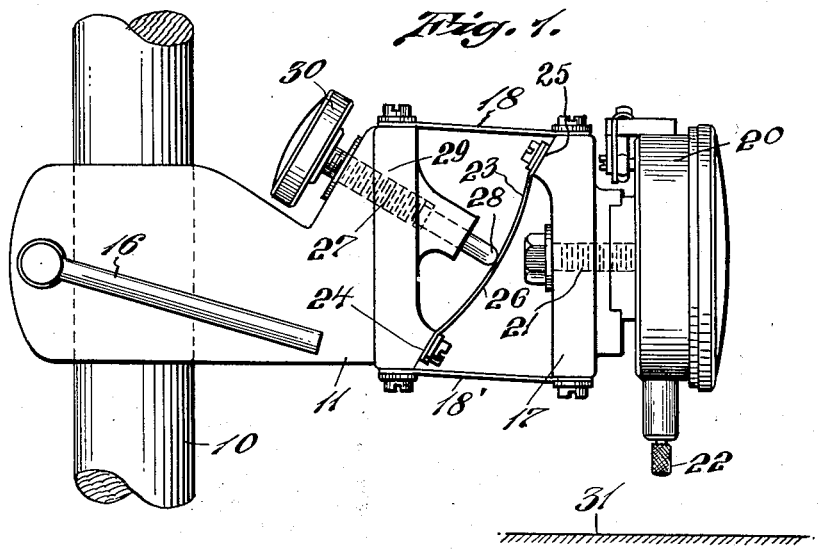
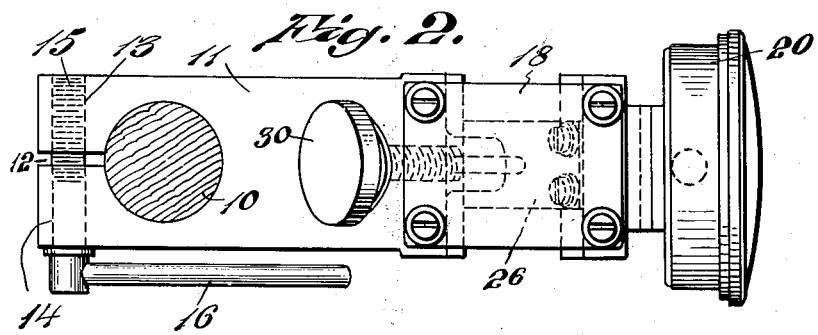
INVENTOR.
Chauncey C. Street
BY Barlow & Barlow
ATTORNEYS.

Patented Oct. 22, 1940

2,219,037

UNITED STATES PATENT OFFICE 2,219,037

COMPARISON MECHANISM

Chauncey Conger Street, Providence, R. I., assignor to Federal Products Corporation, a corporation of Rhode Island Application December 11, 1939, Serial No. 308,669

7 Claims. (Cl. 248—204)

This invention relates to an adjustable mounting for two relatively movable members such for instance, as a dial indicator or some similar comparison mechanism and has for one of its objects to provide a mounting by which small adjustments may be accurately obtained between two members.

Another object of the invention is to provide a mounting whereby large adjustments may be obtained by one means and finer adjustments may be obtained by a separate means.

Another object of the invention is to provide an adjustable mounting which will cause the adjustment to be made along relatively parallel lines by a deformation of a strut which ordinarily would provide a stiffening structure for a rectangular arrangement of the mounting.

Another object of the invention is to provide a mounting by which the comparison mechanism is supported by pantograph springs with a diagonal brace to stiffen and form a rectangular structure with means to deflect the diagonal member and thus deform the rectangular arrangement.

With these and other objects in view, the invention consists of certain novel features of construction, as will be more fully described, and particularly pointed out in the appended claims.

In the accompanying drawing:

Fig. 1 is a side elevation illustrating the deformed rectangular structure;

Fig. 2 is a top plan view of the structure shown in Fig. 1.

Frequently a fine adjustment between two members is desired and is difficult to obtain, such for example as in the use of mountings for comparison mechanism such as a dial indicator; it is desirable to set the dial indicator so that its pointer will read zero when a certain dimension piece of work is placed upon a base support beneath the indicator, and although the zero may be adjusted to varying positions, it is desirable that the zero be located at some definite position such for instance, as vertically at the top of the dial and accordingly, a mounting for the instrument is varied by hand sliding the same up and down some standard until the desired position is arrived at. Such adjustment for very fine readings is exceedingly difficult, and in order that this may be more aptly and conveniently determined, I have provided two members, one of which is the base and the other the member which is to carry the comparison mechanism; and I have supported this latter member from the former by pantograph springs and provided a diagonal element across the arrangement so formed to provide a stiffened rectangle when the element is in a straight line diagonal position; but I have so arranged that I may deflect this diagonal element to deform the rectangle and by such deformation of the pantograph springs cause the members to move relatively in parallel lines, whereby an accurate adjustment may be provided by means of a thread member which will require considerable motion to slightly move the mounting member; and the following is a more detailed description of the present embodiment of this invention, illustrating the preferred means by which these advantageous results may be accomplished:

With reference to the drawing, I have shown one example of a use for this invention, although it may be used in various other locations. In the illustration; 10 designates a standard supported from some suitable base which I have not illustrated. The base member 11 of the mounting consists of a block split as at 12 and provided with a threaded bore 13 and a non-threaded aligned bore 14 through which a bolt 15 extends, this bolt being provided with a handle 16 to tighten the split block upon the standard 10 in some suitably supported position. A mounting member 17 is provided which is supported from the base 11 by the pantograph springs or links 18 and 18' which are flexible but which, because of their relationship, will always cause any relative movement between the base member 11 and the mounting member 17 to be along parallel lines.

A suitable dial indicator 20 is supported from this mounting member 17 by suitable screws 21 with its feeler or contact 22 projecting downwardly along a line parallel to the standard 10.

A diagonal element 23 extends from a point 24 adjacent the connection of the spring 18' to the base member to a point 25 adjacent the connection of the spring 18 to the mounting member 17 and when this diagonal element 23 is in a straight line, the parallel springs 18 and 18' will provide a rectangular structure; when, however, this element 23 is deflected as at 26, the springs 18 and 18' will be out of the rectangular arrangement and a parallelogram arrangement will be formed, that is, the member 17 will be moved into a position in a line parallel to, but slightly lower than, its former position. In order to cause such deflection I have provided a screw 27 having a rounded end 28 and having threaded engagement in the bore 29 with the base member 11. A handle 30 on this screw enables it to be moved axially so as to cause greater or lesser deflection of the diagonal element 23, whereby the amount of movement of the member 17 and the feeler 22 from the support 31 may be accurately gaged so that this desired distance may be very closely set by means of the screw 27 having the handle 30, rather than by attempting to slide the entire structure along the standard 10 by loosening the handle 16 and then tightening it when the desired position has been arrived at.

If it is desired to lower the member 17 or the feeler 22 in relation to the support 31, the element 23 will be caused to have greater deflection, whereas, if it is desired that this be raised, the element 23 will be caused to have less deflection. For convenience the starting position will be a location in which the spring is flexed in order that movement in both directions up or down may be had. By this arrangement the expansion due to change in temperatures of a room may be very easily and accurately followed by placing the gauge block beneath the feeler and adjusting the handle 30 until the indicator reads zero, this being accomplished by each appreciable change in temperature in the room from time to time as occasion may require.

While I have illustrated one particular use for this adjustable arrangement between two members, it will be readily appreciated that various other uses may be provided where accuracy of minute adjustments is desired.

The foregoing description is directed solely towards the construction illustrated, but I desire it to be understood that I reserve the privilege of resorting to all the mechanical changes to which the device is susceptible.

I claim:

1. In combination a pair of members, generally parallel flexible links connecting said members, a diagonal element connecting said members, and means to engage and deflect said diagonal element whereby to relatively move said members.

2. In combination a pair of members, generally parallel resilient flexible links connecting said members and normally forming a rectangular structure, a resilient diagonal element connecting said members, and means to engage and deflect said diagonal element whereby to relatively move said members.

3. In combination a pair of members, generally parallel flexible links connecting said members, a diagonal element connecting said members and a screw mounted in one of said members and engaging said diagonal element to deflect the same and relatively move said members.

4. A mounting for an indicator or the like comprising a base member, a mounting member to carry the indicator or the like, generally parallel resilient springs connecting said members, a resilient diagonal element connecting said members, and means to engage and deflect said diagonal element, whereby to relatively move said members.

5. A mounting for an indicator or the like comprising a base member, a mounting member to carry the indicator or the like, parallel resilient springs connecting said members and normally forming a rectangular structure, a resilient diagonal element connecting said members, and means to engage and deflect said diagonal element to deform said rectangular structure whereby to relatively move said members.

6. A mounting for an indicator or the like comprising a base member, a mounting member to carry the indicator or the like, parallel resilient springs connecting said members, a resilient diagonal element connecting said members, and a screw mounted in one of said members and engaging said diagonal element to deflect the same and relatively move said members.

7. A mounting for an indicator or the like comprising a base member, a mounting member to carry the indicator or the like, parallel resilient springs connecting said members, a resilient diagonal element connecting said members, and a screw mounted in said base member, and engaging said diagonal element to deflect the same and relatively move said members.

CHAUNCEY CONGER STREET.